Figure 1:
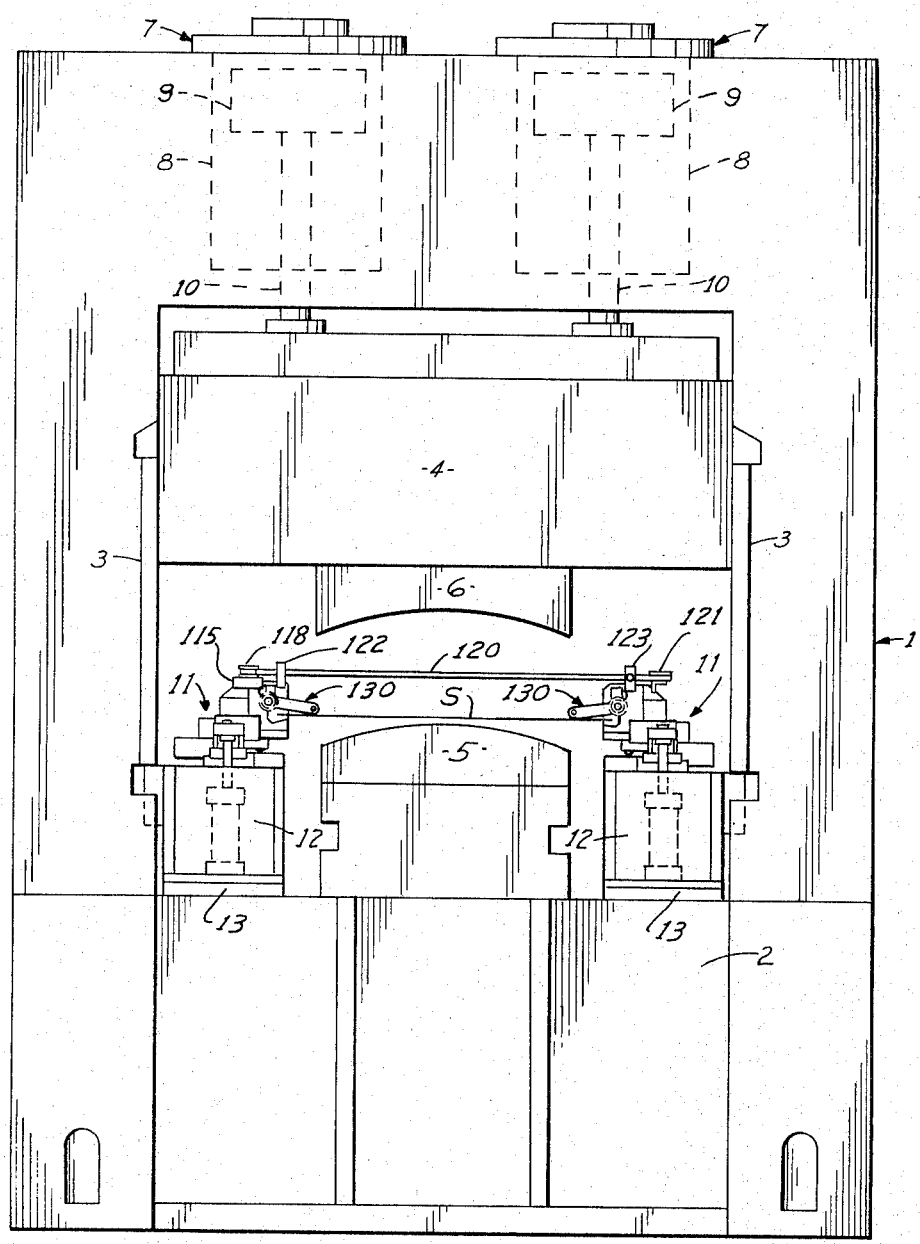

Jan. 30, 1968 S. M. DOLNEY 3,365,921
CONTROL SYSTEM FOR, AND COMBINATION THEREOF
WITH, STRETCH FORMING MACHINES
Filed Aug. 16, 1965 9 Sheets-Sheet 1

INVENTOR.
Stanley M. Dolney,
BY John H. Leonard,
his ATTORNEY.

INVENTOR.
Stanley M. Dolney,
BY John H. Leonard,
his ATTORNEY.

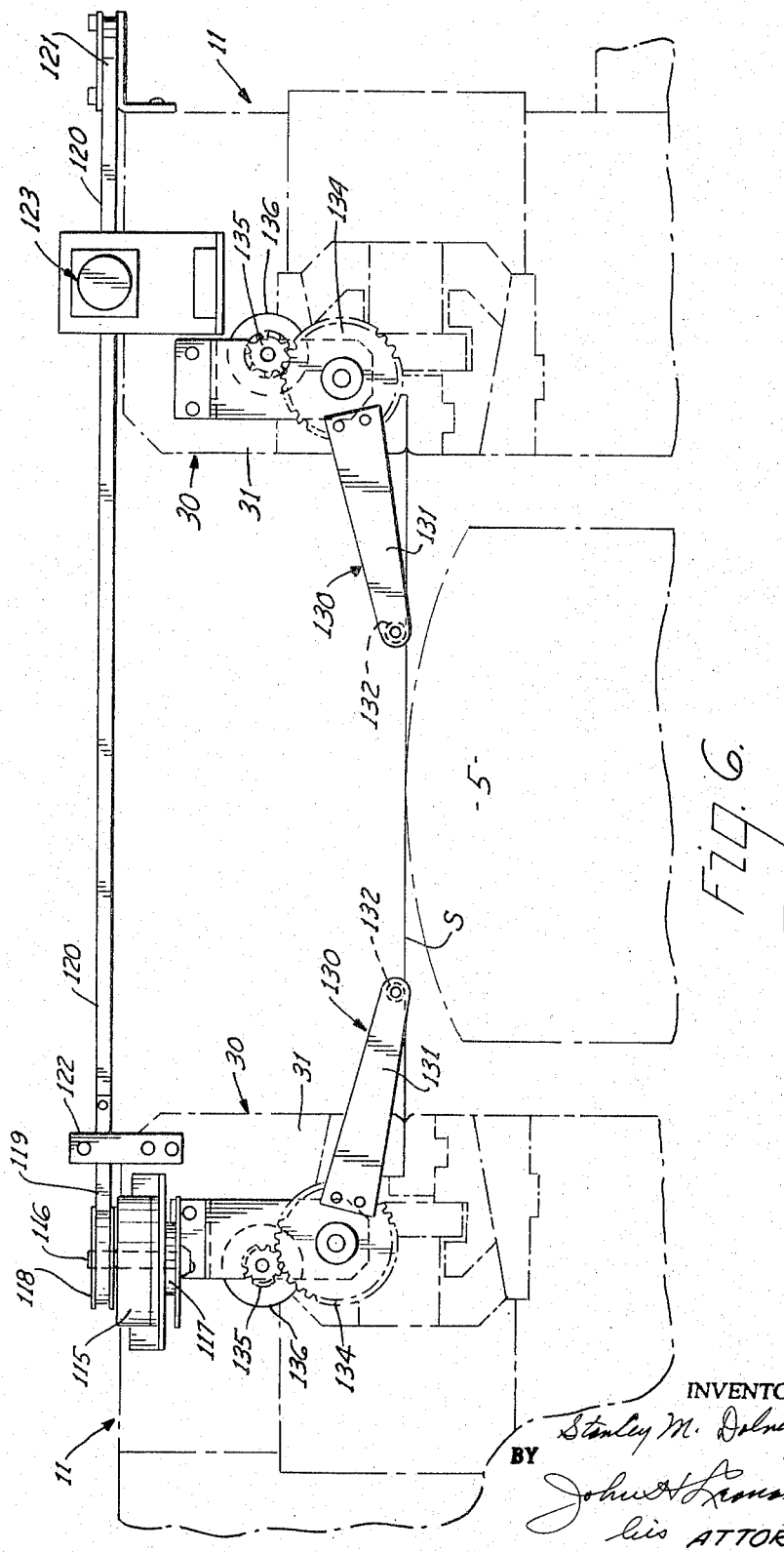

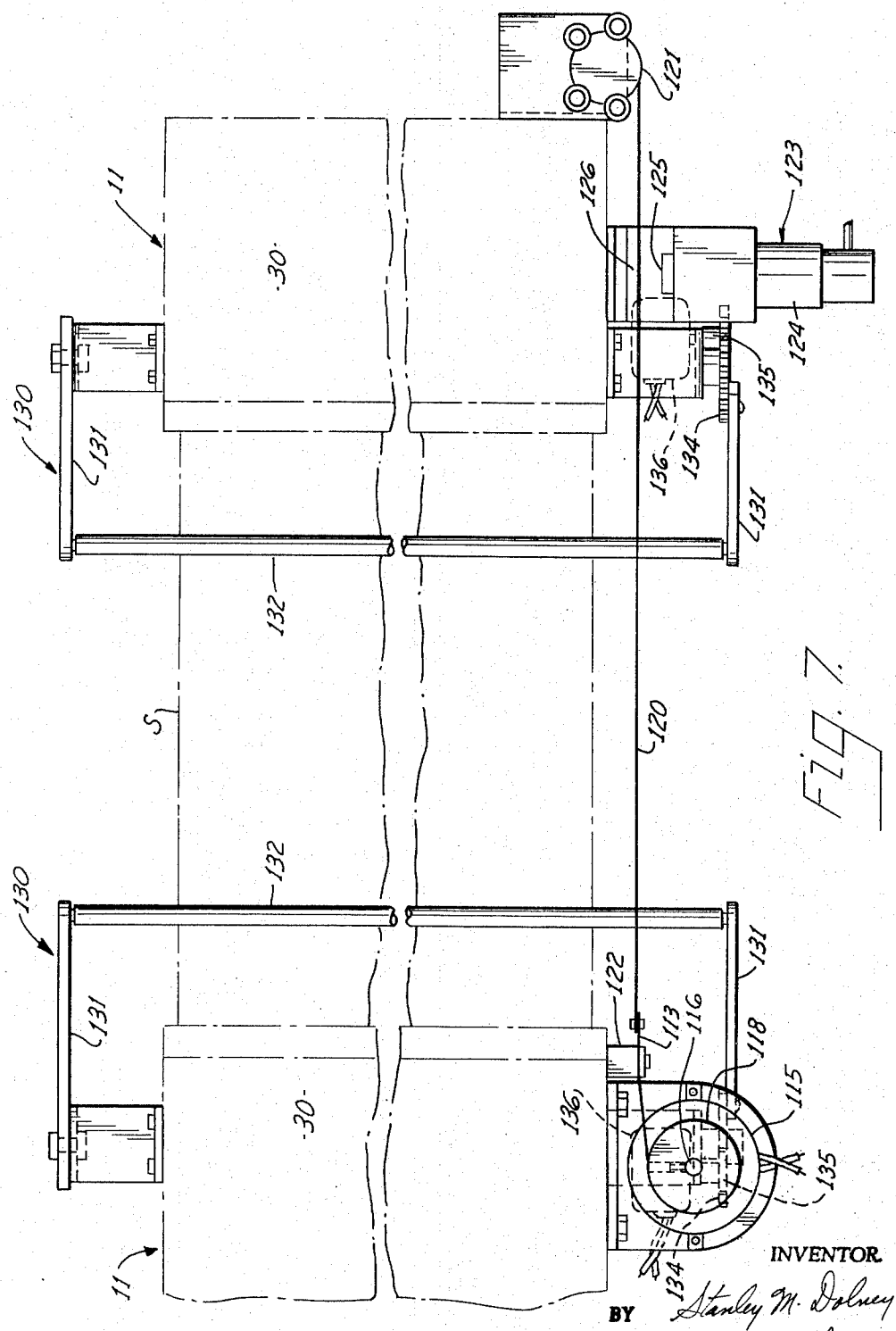

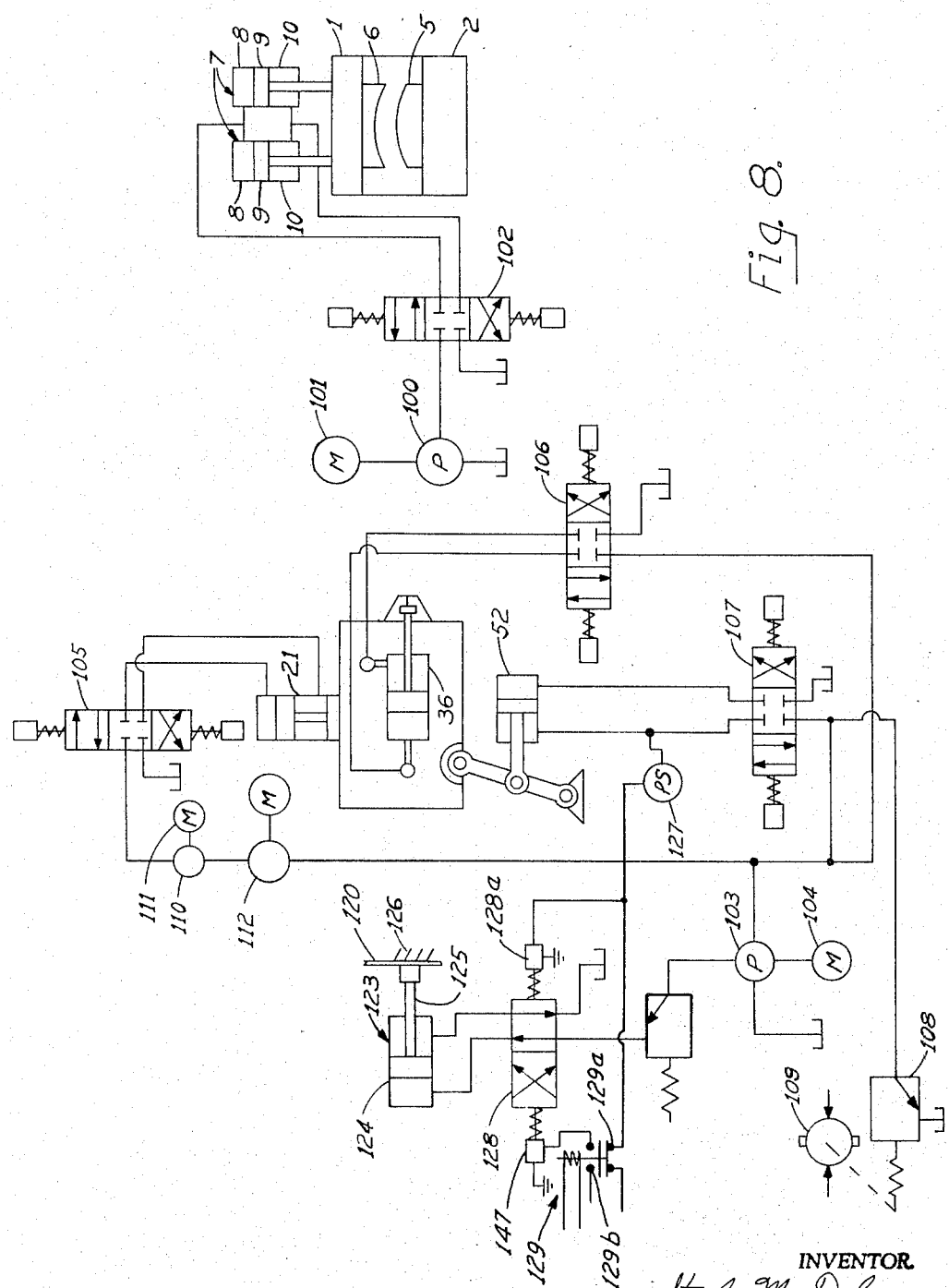

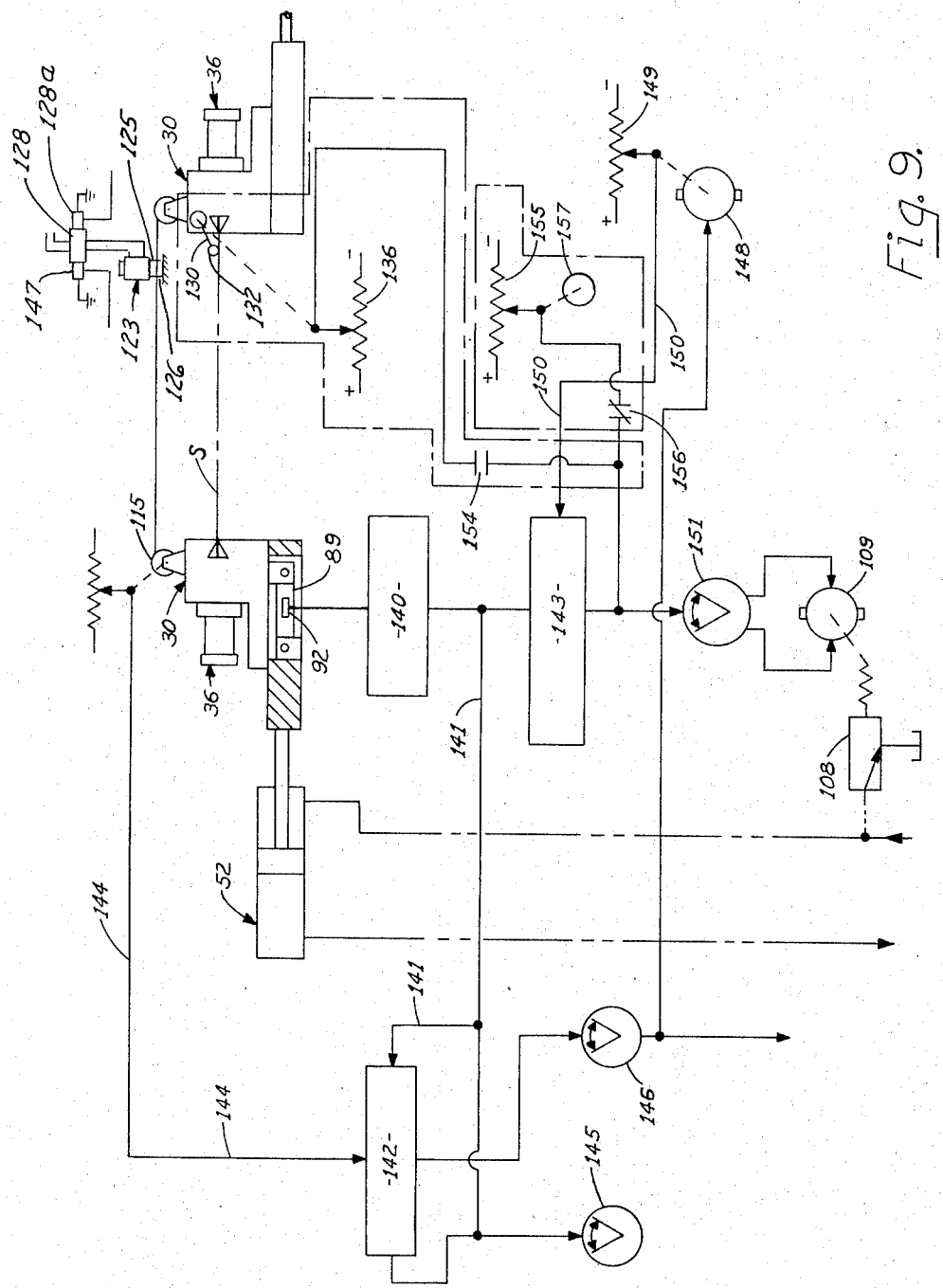

United States Patent Office 3,365,921
Patented Jan. 30, 1968

3,365,921
CONTROL SYSTEM FOR, AND COMBINATION THEREOF WITH, STRETCH FORMING MACHINES
Stanley M. Dolney, Parma, Ohio, assignor to The Cyril Bath Company, Cleveland, Ohio, a corporation of Ohio
Filed Aug. 16, 1965, Ser. No. 479,849
20 Claims. (Cl. 72—12)

This invention relates generally to the stretch forming of sheet metal stock in stretch forming machines such as stretch-draw presses, radial draw formers, and the like, and particularly to a control for such machines and the resultant machine and control combinations.

The invention is described herein for purposes of illustration as embodied in a stretch-draw press of the general type disclosed in U.S. Letters Patent Cyril J. Bath, No. 3,116,780, issued January 7, 1964, and entitled Prestretch Fixture and Combination Thereof with Drawing Die Press, and in my copending application Ser. No. 376,751, filed June 27, 1964, now Patent No. 3,302,437, and entitled Tension Control.

For brevity in the description and claims, the stretch draw press is described herein as in an upright position wherein the ram operates in a vertical path for opening and closing companion male and female drawing dies, the stretch heads are arranged at opposite sides of the ram path in an initial position to stretch the sheet horizontally before its contact with the male die, and the stretch heads are arranged to be lowered for laying the stock onto the male die on the bed of the press while horizontal components of stress are being applied by the stretch power means.

The terms "upright," "horizontal," and the like, where used herein and in the description and claims, are used in a relative sense for defining relative positions and movement of various parts, and not as absolutes.

Generally the invention is directed to a control system incorporated in such machines so as to detect accurately the yield of the stock and the tension at yield preparatory to the forming of the stock by the machine, to maintain preselected tension on the stock during the forming thereof, to initiate the forming cycle immediately upon detection of yield, and to modify the horizontal components of tension applied to the stock by the stretch power means of the machine in accordance with the angularity of the stock with the horizontal so that the tension applied along the length of the stock remains constant throughout changes in the angularity of the stock from horizontal.

More specifically, the invention is directed to subjecting the stock initially to horizontal components of tension by suitable stretch power means until tension at yield is reached and while the stock is generally horizontal and positioned out of contact with the dies, and then, lowering the stretch heads by suitable elevator power means for wrapping the stock around the male die, the horizontal component of stretching force applied by the stretch power means being reduced during the wrapping operation so that, when combined with the downward component applied by the elevator power means the resultant forces along the downward slope of the portions of the stock between the male die and stretch heads are maintained substantially equal to the original horizontal component of tension at yield. The purpose of such control is to assure that the stock is maintained at the proper tension above its elastic limit and yet is not overstressed during its partial stretch forming about the male die by the stretch heads and its final die drawing by cooperation of the male and female drawing dies.

Figure 2:
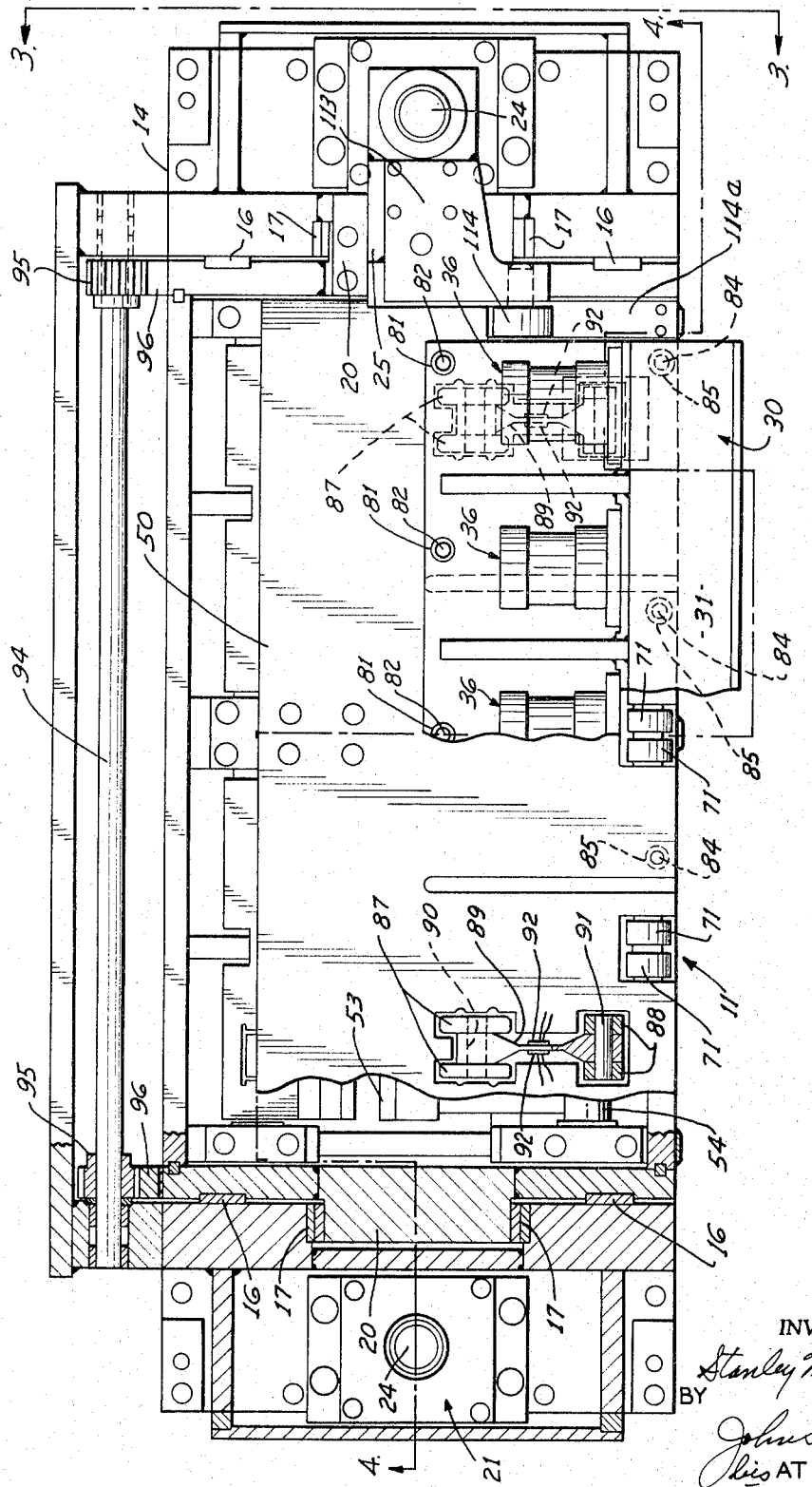
Figure 3:
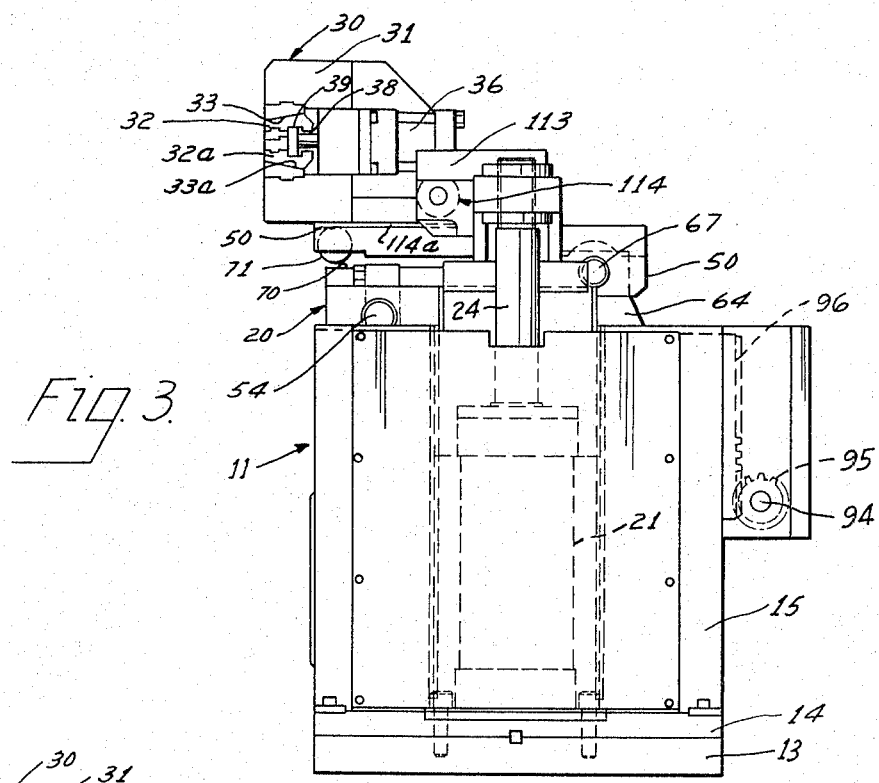
Figure 5:
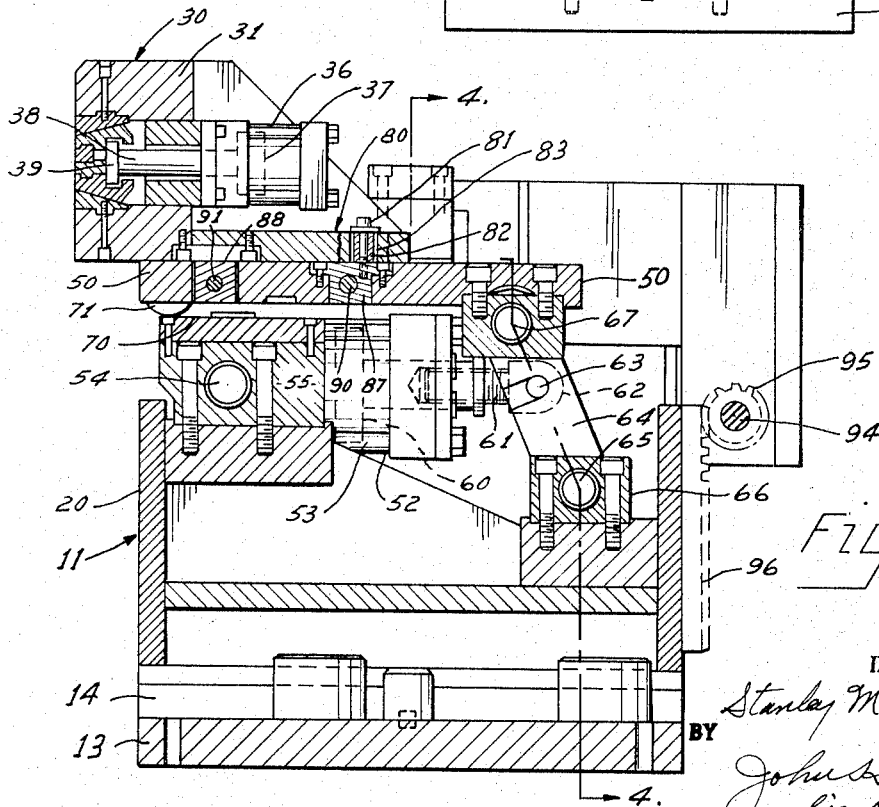
Figure 4:
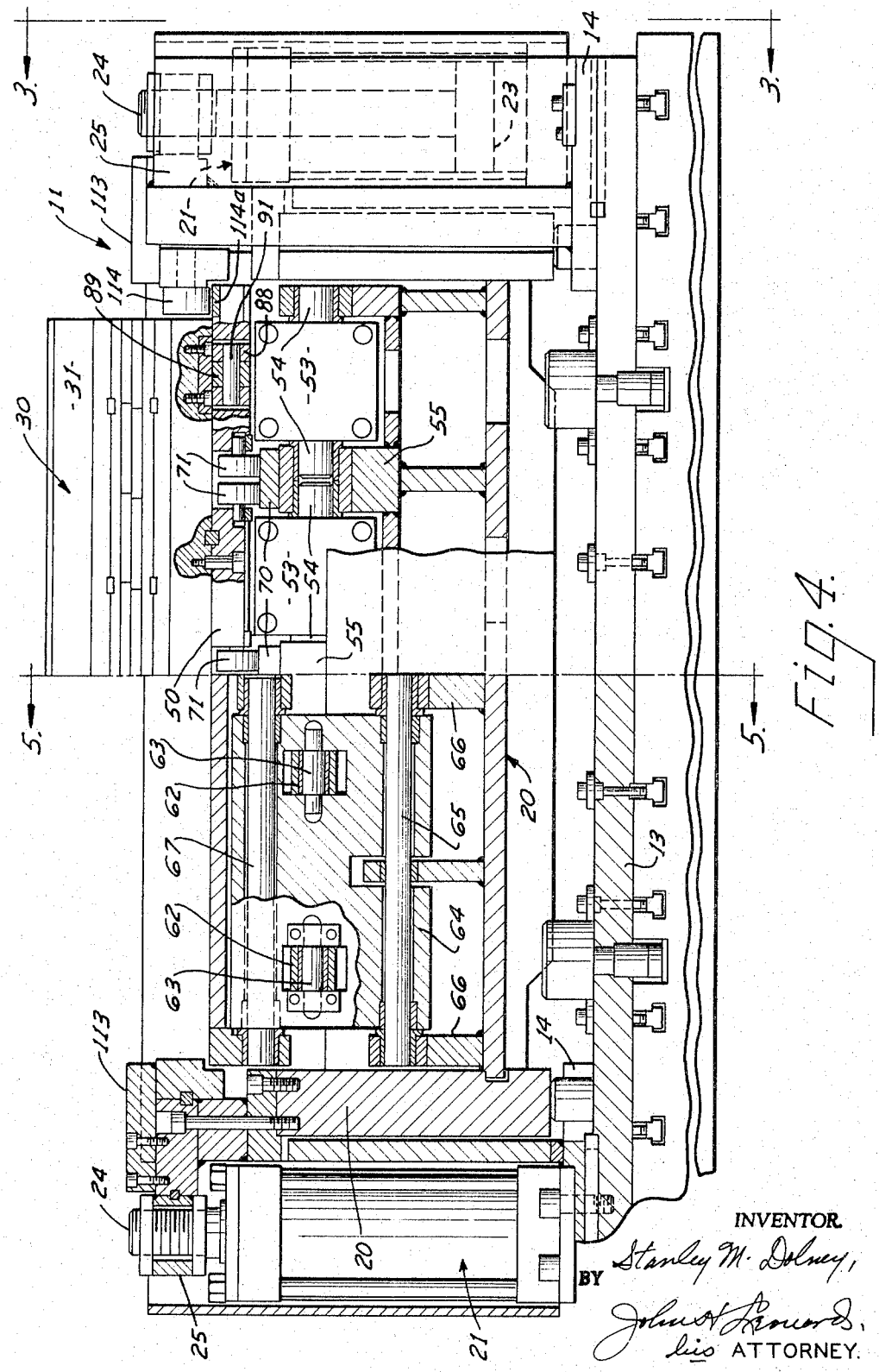
Figure 10:
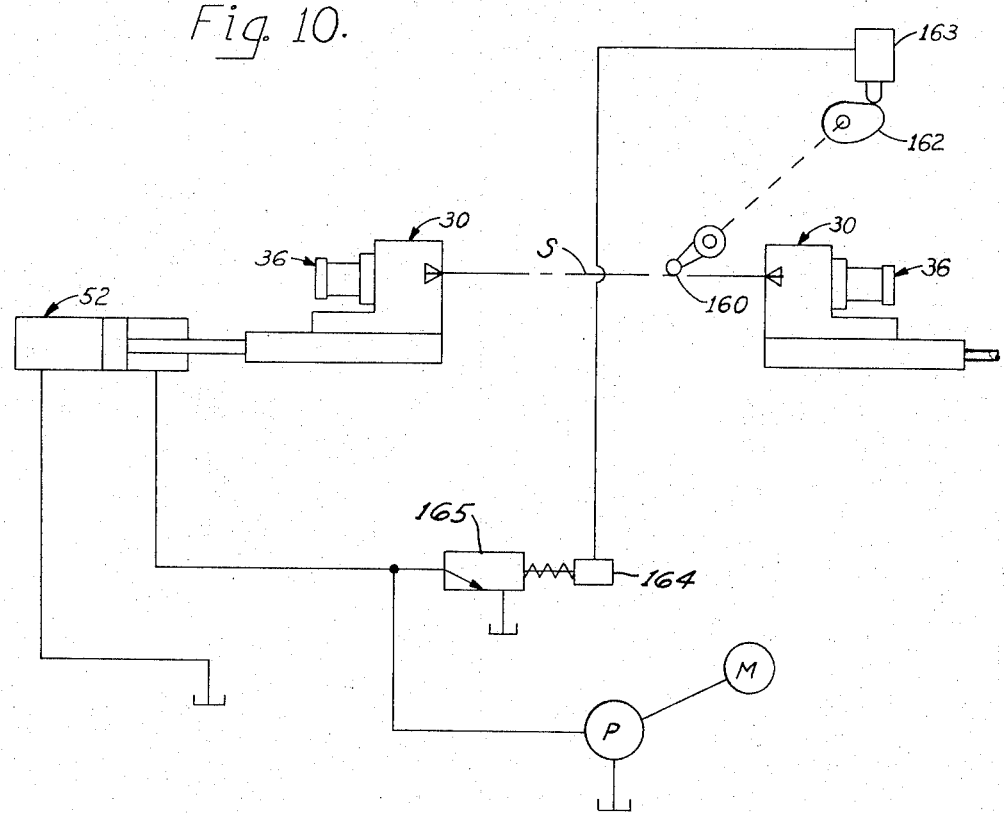

Various other specific objects and advantages will become apparent from the following description wherein reference is made to the drawings in which:

FIG. 1 is a front elevation of a stretch draw press embodying the principles of the present invention;
FIG. 2 is an enlarged fragmentary top plan view of one of the stretch forming units of the press a part thereof being shown in section for clearness in illustration;
FIG. 3 is a right end elevation of the unit shown in FIG. 2;
FIG. 4 is a vertical sectional view taken on the line 4—4 in FIGS. 2 and 5, a part thereof being shown in section for clearness in illustration;
FIG. 5 is a vertical cross-sectional view taken on the line 5—5 in FIG. 4;
FIG. 6 is a fragmentary side elevation of the stretch draw units illustrated in FIG. 1, showing a yield detector and angulation control embodying the principles of the present invention;
FIG. 7 is a top plan view of the structure illustrated in FIG. 6;
FIG. 8 is schematic showing of a hydraulic system of the present invention;
FIG. 9 is a wiring diagram showing the electrical controls for the present invention; and
FIG. 10 is a diagrammatical illustration of a modified form of angulation control.

Referring to the drawings, the invention is shown as incorporated in a conventional hydraulic press 1 having a bed 2 with upright guide posts 3 arranged at the corners thereof and guiding a ram 4 for vertical movement toward and away from the bed. The bed 2 supports a male drawing die 5 and the ram supports a complementary female drawing die 6. The dies 5 and 6 are conventional drawing dies which define, when closed, a concavo-convex pattern into which the metal is drawn by the closure of the dies. The ram is driven on its forming and return strokes by means of a hydraulic piston and cylinder assemblage 7 comprising cylinders 8 with pistons 9 therein and having piston rods 10 secured to the ram.

Mounted on the bed 2 is a prestretch fixture, indicated generally at 11, which comprises two units 12 arranged on the bed 2 between the posts 3, one unit at each side of the male die 5. Since the units are the same in form and function, only one unit 12 will be described in detail.

Referring particularly to FIGS. 2 through 5, each unit comprises a base plate 13 on the ends of which are mounted guide supports 14 which support unright guides 15. Each guide 15 has upright slide surfaces 16 facing inwardly of the unit in a direction forwardly and rearwardly of the bed, and upright guide faces 17 at right angles to the surfaces 16. Mounted for vertical reciprocation in the slideways is a stretch head elevator 20 which is guided thereby for movement upwardly and downwardly while the elevator itself remains parallel to its starting position.

For moving the elevator 20 upwardly and downwardly, suitable piston and cylinder assemblages 21 are provided, one at each end of the elevator. Each assemblage comprises a cylinder 22 mounted in fixed position on the support 14. A piston 23 is reciprocable in the cylinder and has a piston rod 24 which is connected to a plate 25 on the elevator 20. Thus, upon introduction of the hydraulic pressure fluid to the head ends of the assemblages 21, they move the elevator 20 upwardly, and by introduction of the fluid to the rod end of the cylinders, they pull the elevator 20 downwardly. These movements are under yieldable hydraulic pressure and controllable independently of the operation and control of the ram piston and cylinder assemblages 7.

In order to stretch the stock into a range above its elastic limit independently of the dies, suitable gripper heads 30 are provided, one for each unit 11. Each head comprises an elongated body 31 which, endwise, extends forwardly and rearwardly of the press bed, and thus transversely of the direction in which the stock is to be tensioned. Each head has complementary gripping jaws 32 and 32a which are cooperable with cam surfaces 33 and 33a, respectively, so that when the jaws are moved toward the dies they grip the stock firmly. Each pair of jaws extends substantially the full length of the head.

In order to close its jaws, each head is provided with a plurality of cylinders 36 in which pistons 37, having piston rods 38, are reciprocable. The rods 38 are connected by enlarged heads 39 to the jaws 32 and 32a for causing them to move along the cam surfaces 33 and 33a toward and away from the dies for opening and closing the jaws. A plurality of such piston and cylinder assemblages are provided, six being employed in the form illustrated. They are connected in parallel common manifolds so that the jaws can be operated for clamping and releasing the sheet.

As mentioned hereinbefore, it is desirable that each head 30 be arranged so that it can move toward and away from the dies under the yieldable resistance of the hydraulic stretch forming pressure, without binding and with a minimum or negligible amount of frictional stresses. For this purpose, each head 30 is mounted on a carriage 50 which is carried on the elevator 20 for movement relative to the elevator toward and away from the adjacent ends of the dies in a horizontal path.

In order to mount the carriage 50 on the elevator 20 while maintaining it under the yieldable restraint of the hydraulic stretch forming pressure, a stretch forming assemblage 52 is mounted on the elevator 20. The assemblage 52 is shown as a bank of cylinders 53. The cylinders 53 are supported by trunnions 54 for rocking about a horizontal axis extending lengthwise of the gripper head. The trunnions 54 are rockably supported in suitable bearings 55 which are rigid with the elevator 20.

Each cylinder 53 carries a piston 60 with a piston rod 61. The rods extend generally horizontally and each has an eye 62 at its outer end by which the rod is pivotally connected by a pivot 63 to an associated rocking link 64, three of which are used with six cylinders 53. The links 64 are arranged approximately upright and at their lower ends are provided with pivots 65. The pivots are mounted in suitable bearings 66 on the elevator 20, for rocking about a common pivotal axis. As mentioned, in the form illustrated, three links are provided for each unit.

At their upper ends, the links 64 carry pivots 67 by which they are connected to suitable bearing portions on the carriage 50 for rocking relative thereto. The pivots 63, 65 and 67, and also the trunnions 54, are horizontal and parallel to each other.

At that edge of the elevator 20 adjacent the dies, the elevator is provided with upwardly facing horizontal trackways 70. The trackways extend toward and away from the dies. The carriage 50 is provided with rollers 71 which normally rest on the trackways 70, respectively.

As illustrated in FIG. 5, each gripper head 30 is mounted on the carriage 50 for limited horizontal movement relative thereto toward and away from the dies. For this purpose the gripper head 30 is mounted on a base 80 which is held in position on the carriage 50 by means of a series of bolts 81 and spool keepers 82. The bolts extend through bores 83 in the base 80. The spools 82 fit the bores 83 with slight radial clearance and thus permit the base 80, and thereby the head 30, to move a small fraction of an inch relative to the carriage along the top of the carriage 50 toward and away from the dies. The base 80 is also connected to the carriage 50 with similar bolts 84 and spools 85 arranged at the forward end of the carriage 50. These spools likewise permit a slight movement of the base 80 toward and away from the dies relative to the carriage 50 and prevent the forward end of the base from lifting upwardly relative to the carriage 50.

This arrangement provides true readings of tension when the tensioning force imposed by the sheet is parallel to the plane of the carriage 50 and load bars 89. However, due to binding stress occurring if the tensioning force applied by the sheet is at an angle to the carriage, the true tension is not reflected in the latter instances.

Brackets 87 are mounted on the carriage 50 at the opposite end thereof from the gripping jaws. Brackets 88 are mounted on the gripper head 30 for movement therewith and with the base 80. A tension bar 89 is connected by pivots 90 and 91, respectively, to the brackets 87 and 88. The tension bar has a portion intermediate its ends which is thinner than the end portions and by which tension is measured. Sensing devices 92, in the form of strain gauges, are mounted on the tension bar for measuring the tension, which is a function of the elastic elongation of the bar 89. Two such tension bars 89 are connected to the head 30 and are arranged at opposite sides of the center line of the head, each preferably midway between the nearest end of the head, forwardly and rearwardly of the press, and the centerline of the head.

In order to assure that the elevator 20 retains the same level at both ends, a suitable shaft 94 is mounted on the machine frame and carries gears 95 at its ends. The gears 95 are in mesh with racks 96 on the opposite ends of the elevator, so that the shaft 94 constrains the elevator to rise and fall the same distance at each end.

The strain gauges may be such as disclosed in U.S. Letters Patent No. 2,292,549, issued August 11, 1942. The circuitry for use of signals from such strain gauges is well known and is here shown broadly diagrammatically. A more detailed description may be found in U.S. Letters Patent No. 2,849,048, issued August 26, 1958.

Referring to FIG. 8, the ram piston and cylinder assemblages 7 may be supplied with pressure fluid from a pump 100, driven by a motor 101, through a solenoid operated, spring restored, cutoff and reversing valve 102.

The other piston and cylinder assemblages may be supplied by a pump 103 driven by a motor 104. The supply to the elevator assemblages 21 is through a spring return solenoid operated cutoff and reversing valve 105, and that to the gripper cylinder 36 through a like valve 106. The supply to the stretch forming assemblage 52 is through a solenoid operated spring return cutoff reversing valve 107.

A variable relief valve 108, for controlling the applied tension is connected between the pump and valve 107, and is driven by a reversible motor 109.

A flow regulator 110, controlled by a motor 111, is interposed between the pump 103 and the valve 105, as also is a motor driven pressure regulator 112.

The stretch units being duplicates, like circuits may be provided for each.

The structure thus far described is disclosed in the patent and does not embody the present invention.

The present invention has to do primarily with the control of the foregoing apparatus.

For accurate control, the elongation of the sheet and the tension being applied should be compared so as to determine the ratio of strain to stress and thereby detect when the yield of the stock is reached and the amount of tension being applied at yield.

At this point it should be noted that on a graph showing the ratio of stress to strain, wherein the stress is the ordinate and the strain the abscissa, the curve rises somewhat lineally from zero as the stress and strain increase, and then veers off in the direction of increasing strain. It is at this point that yield is reached. The exact point is difficult to detect exactly, and hence yield is accepted as being at about 0.2 percent away from the curve in the increasing direction of strain, thus assuring that the yield point actually has been reached. This may be allowed for in the setting of the various switches and the like.

It is apparent from the foregoing description that the actual tension applied to the stock can readily be obtained from the strain gauge 92 on the tension bars 89 when the jaws are holding the sheet in horizontal position clear of the male die 5. In such a position, the horizontal component of tension is the only tension component and this is truly reflected by the tension bars 89 and their strain gauges 92, and generally it is the highest tension that will be applied by the stretch forming piston and cylinder assemblages to the stock during the forming operation. However, when the yield point is reached with the stock in this position, it is desirable to maintain the stock under the same tension which caused yield during the entire forming operation.

However, if the head 30 is lowered to wrap the stock on the male die 5, and the carriage 50 can swing upwardly about its pivot 67 so that the stock is tangent to the die, the load bars are aligned with the downwardly sloping portions of the stock between the die 5 and heads 30, and thereby reflect the tension along the sheet, instead of the horizontal component only. This is desirable generally.

Again, it is desirable in many instances, particularly where the end of the male die slopes downwardly abruptly, that the carriage be restrained from such rocking movement about its pivot 67 and constrained to move downwardly in vertically fixed relation to the elevator. The advantages of such an arrangement are that, since the head cannot rise or swing upwardly relative to the descending elevator, a much shorter elevator stroke is required to bring the gripped margin of the stock to the same elevation as the bottom edge of the forming face at the end of the male die, the jaws can approach horizontally substantially to the end of the die, and can exert on the stock substantially vertical tensioning components only, and these vertical components can be imparted by the elevator. Thus, the stock loss in trim is substantially only that actually gripped by the jaws.

To obtain these advantages, however, the advantages of having the forces applied by the heads 30 directed parallel to the tension bars 89 must be sacrificed. As a result, the bars 89 cannot reflect the tension on the stock when the stock portions between the die 5 and head 30 slope downwardly away from the die 5, and some modification of the mountings of the heads 30 and additional control means are necessary.

For example, assuming the stock is tensioned to yield and this has been determined and the lowering of one or the other heads is begun, and the heads are not permitted to swing upwardly and downwardly about the axis of the pivot 67, the tension component exerted by the stretch forming assemblages 52 are directed horizontally only. On lowering of the elevators with the head 30 thereon, the stock strikes the male die and the portions between its point of contact with the male die and the lowered head 30 slope downwardly. As this angle of downward slope increases, the vertical component of force exerted by the elevator increases. This vertical component combines with a horizontal component exerted by the stretch forming power means or assemblages 52 to produce a resultant tensioning force along the downwardly sloping portion of the sheet. If the originally imposed horizontal component of tension at yield applied by the stretch power means were maintained constant, this resultant force would be greater than the tension at yield force originally imparted horizontally by the head 30. It is necessary, therefore, if the stock is to be held under constant tension, tension at yield being preferred, then upon lowering of the head 30 with a consequent change in the angle or downward slope of the sheet between the die 5 and the head 30, the tensioning component horizontally applied to the stock by the stretch forming assemblages 52 must be reduced sufficiently so that resultant reduced component combined with the vertical component imposed by the heads 30 provides a resultant force along the slope of the sheet which is substantially equal to the horizontal component of force originally applied by the stretch heads 30 when this sheet was horizontal and out of contact with the die. It becomes desirable, therefore, to assure that the components of tension applied by the stretch power means will be horizontal, first to constrain the heads 30 from swinging about their pivots 67 upwardly away from the carriages 50. It also becomes necessary to determine accurately the tension at which yield occurs and subsequently to maintain this tensioning force regardless of the change in elevation of the stretch heads 30.

For this purpose, suitable brackets 113 are provided on the opposite ends of the elevator 20. Mounted on these brackets for rotation about horizontal axes extending parallel to the axis of the pivot 67 are hold-down rollers 114, respectively. The hold-down rollers 114 operate on upwardly facing horizontal trackways 114a on the ends of the carriage 50.

In order to determine the yield of the metal it is desirable that the strain or elongation of the sheet be determined as nearly directly from the sheet itself as practicable so that lost motion between the various moving parts, frictional forces, and the like, do not interfere with detection of a true result. In accordance with the present invention, measurement of yield is taken directly from the gripping heads 30 themselves. Since the sheet stock does not slip in the jaws, such a measurement is tantamount to an actual measurement taken on the sheet itself during strain. For this purpose, one of the heads 30, for example, the left hand head in FIG. 6, is provided with a potentiometer 115 which is mounted on a shaft 116 for rotation about a vertical axis, and which is provided with a rewind spring 117 which normally restores it to zero position. Mounted on the shaft 116 of the potentiometer for rotation therewith is a drum 118. If desired the drum may be adjustable circumferentially of the shaft 116 and locked in place by the usual lock screw at the desired zero position of the potentiometer. Likewise the tension of the spring 117 may be adjusted by conventional means. Wound on the drum 118 is a flexible member or tape leader 119 to which is connected one end of the flexible tape 120. The other end of the flexible tape 120 is wound on a self-winding spring return reel 121 such as is usually used for measuring tapes of the self-winding type. The potentiometer spring 117 is of greater strength than that of the spring of the self-rewinding reel 121 so that the spring 117 returns the potentiometer 115 to its zero position by winding part of the tape off of the drum 121. The tape lead 119 extends to a suitable guide 122 adjacent to the potentiometer which may act as a stop to limit the return of the potentiometer 115 by the spring 117.

The other head 30 carries a clamping piston cylinder assemblage 123, including a cylinder 124 and a piston 125. A cooperating clamping shoe 126 is mounted in fixed position on the head 30. The tape 120 passes over the clamping surface 126 in advance of the reel 121. The piston cylinder assemblage 123 is operated in response to a pressure switch 127, which operates a solenoid valve 128, as illustrated in FIG. 8, for driving the piston 125 into clamping engagement with the shoe 126, thereby clamping the portion of the tape 120 therebetween for movement with the head 30.

This arrangement is such that when the heads 30 are moved toward each other for loading the sheet, the potentiometer 115 is self-returned to its selected zero position and unwinds the tape from the reel 121 to the extent necessary for such return. After clamping the gripping jaws 31 on the sheet of stock, the heads 30 are moved relatively apart by the stretch forming assemblages 52. As they move apart, they first remove the sag from the sheet. During this operation the tape 120 unwinds from the reel 121, due to the greater strength of the potentiometer spring 117. When the sag has been removed, but before the sheet is put under stretching tension, for example, when the sheet is subjected to a pull of a few hundred pounds, the pressure switch 127 causes the assemblage 123 to operate to apply the piston 125 to the tape 120, thus locking the tape in fixed position relative to the right hand head 30. Thereafter as the assemblages 52 continue to apply force to the heads 30 to stretch the sheet, the tape 120 rotates the potentiometer 115, which gives a signal reflecting the elongation or strain on the sheet itself. Concurrently, the tension bars 89, through strain gauges 92, provide a signal reflecting the tension or stress.

Thus the ratio of stress to strain can readily be reflected. Consequently, when the strain increases suddenly relative to the stress, the yield point is reflected. This occurs while the sheet is horizontal and subjected only to a horizontal force which is applied by the stretch power means or assemblages 52. However, when one of the heads 30 is moved downwardly, the sheet engages the die 5. Upon continued downward movement, the portion of the sheet between the die 5 and the head 30 slopes downwardly to an increasing degree. Such slopes would increase the tension endwise of the sheet if the tension provided by the stretch forming assemblages 52 remained unchanged.

It is necessary, therefore, to change the component of force applied by the stretch forming assemblages 52 by modifying the setting of the relief valve 108 dictated originally by the load bars 89 and strain gauges 92.

In order to determine the amount of relief, a suitable angulation device 130 is provided. Generally the die 5 is set on the press bed so that only one end of the die slopes downwardly steeply. Consequently, the angulation device need be mounted only on one of the heads. However, one may be mounted on each head, if desired, and a separate electrical system provided for each device.

The angulation device 130 comprises rocker having arms 131 pivotally mounted on the head 30 and extending forwardly therefrom in parallel relation to each other. At their outer ends, in position forwardly of the associated head 30 and adjacent to the forward ends of the heads 30, the arms carry a suitable roller 132. The roller 132 is adapted to ride on the portion of the sheet stock S between the die 5 and the associated head, preferably close to the head and cause the arms 131 to rock upwardly to an extent depending upon the angularity of the downward slope of a portion of the sheet between the die 5 and the head 30.

Mounted on one of the arms for rotation therewith is a main gear 134 which drives a smaller gear 135 of a potentiometer 136. The potentiometer 136 is zeroed when the sheet is horizontal and its rotation by virtue of the riding of the roller 132 on the sheet as the sheet swings downwardly provides a signal reflecting the downward slope. As mentioned, such an angulation device may be provided on both of the heads, particularly, since each stretch forming unit, including the head 30 and the stretch forming assemblages 52 are operable independently of the others. In the wiring diagram hereinafter described, the circuit for the angulation device of only one head is shown.

Generally it is desired that, when yield is reached, to release the piston 125 and thereby permit the tape 120 to unreel from the reel 121 so that the potentiometer 115 can be restored to its position. Also it is desirable that, as the yield is reached, that the machine automatically start its stretch-draw cycle of operation. All of these effects can be obtained readily by the structure described and the circuit is illustrated in FIG. 9.

*Operation*

Assume that a piece of sheet of stock S is gripped by the heads 30 and pressure fluid is being admitted to the stretch forming assemblages 52 for moving the heads relatively apart. As the pressure builds up in the hydraulic assemblages 52 to a few hundred pounds, the pressure operates the pressure responsive switch 127. As shown in FIG. 8, the switch 27 engages the solenoid 128a of a valve 128 which is connected to the piston and cylinder assemblage 123, thus operating the piston 125 to clamp the tape 120 for movement with the head 30 opposite the one which carries the potentiometer 115. The solenoid 128a is connected to the switch 127 through normally closed contacts of a delay 129 having a pair of normally closed contacts 129a and normally open contacts 129b. Thereupon, the potentiometer 115 is placed in operation. As the pressure increases in the assemblages 52, the heads 30 remain at the same elevation with the sheet S horizontal and out of contact with the die 5. An increase in tension is reflected by the load bar 89, and thereby the strain gauges 92 feeds a signal reflecting the tension of the sheet to an amplifier-rectifier 140. This tensioning force is horizontal and parallel to the bars 89 and is the true tension on the stock S.

The amplifier-rectifier 140 feeds one signal through a conductor 141 to a rate detector 142. The same signal is also fed to a differential amplifier 143. Meanwhile the potentiometer 115 is operating and provides a signal which is fed by a conductor 144 to the rate detector 142. The rate detector 142 reflects the ratio of stress to strain. The detector 142 feeds a signal to a tension meter relay switch 145 which indicates the tension applied on the sheet and operates a stop circuit for the machine if the tension exceeds that at yield.

The detector 142 also feeds a signal to the yield meter relay switch 146 which is set to close when the yield plus about 0.20 percent of yield is reached. Upon closure, it operates the relay 129, opening the normally closed contacts 129a and closing the normally open contacts 129b which latter connect the solenoid to a source of power and thereby energizes solenoid 147 for causing the assemblage 123 to release the tape 120. It also causes the valves 105 and 102 to initiate operation of the ram 4 and elevators 20. Thus the cycle of operation of the machine is started. The switch 146 also causes operation of a servomotor 148 which drives a yield memory potentiometer 149. The yield memory potentiometer 149 remembers the tension at which yield occurred. The memory potentiometer 149 feeds a signal back to the differential amplifier 143 through the conductor 150. The differential amplifier 143 combines the remembered tension at yield from the potentiometer 149 and the tension signal from the load bar 89, and produces a resulting signal which is fed to a relay meter switch 151. The relay meter switch 151 is a normally open two-way switch. The switch when closed in one direction causes operation of the servo-motor 109 in the direction for gradually closing the variable flow relief valve 108 and when closed in the opposite direction causes reverse operation of the servo motor 109 for gradually opening the valve 108. The differential amplifier 143 thus far reflects the difference in the actual horizontal component of tension on the load bars 89 and maintains the tension on the sheet constant so long as only the horizontal component applied by the assemblage 52 is involved. As the elevators 2 lower the heads 30 and the sheet slopes downwardly toward its ends, the sheet is no longer subjected only to the horizontal component of the stretch assemblages 52, but also to a vertical component imposed by the elevator assemblage 20. The angulation potentiometer 136 provides a signal which is fed to the output side of the differential amplifier 143 where it is combined with the output signals from the differential amplifier 143 before the latter signals reach the meter relay switch 151. The signal obtained from the angulation potentiometer is sufficiently large so that it does not have to be amplified. The servomotor 109 responds to signals from the differential amplifier 143 and to the signals from angulation potentiometer 136. The differential amplifier is such that it can add the remembered signal, the signal from the angulation potentiometer, as the downward slope increases. This addition is in predetermined relation to the angle so that the signal received by the relay meter switch 151 reflects an increase in tension as the angle of slope increases. Thereupon, the relay meter switch 151 causes the servomotor to open the relief valve proportionately so that the downward vertical component imposed by the elevator assemblages 21 is balanced out by reduction in the horizontal component imposed by the assemblages 52, with the resultant tension along the slope of the sheet maintained substantially that at yield.

A normally open switch 154 is provided for cutting out completely the angulation system, if such is desired, so that tension control only is effective.

An adjustable potentiometer 155 may be provided and connected by a normally closed switch 156 at the output side of the differential amplifier 143. The potentiometer 155 is manually adjustable by a knob 157 for obtaining a very precise adjustment of the signal or for varying the effect of the remembered signal, if desired. In some instances, such as repetitive production of like articles, its selected signal may be used instead of the remembered signal.

The specific control system for manual and limit switch control operation of the machine is known, and is not shown herein. However, it is pointed out that the meter relay switch 146, when closed upon finding yield, can also cause operation of the valve 102 for initiating the operation of the ram, or the valve 107 for initiating operation of the stretch heads, and the valve 105 for initiation of the elevators 20. On the other hand, the earliest existing system of cycling may be employed wherein the same operations, by limit switches, causes the proper sequence of operation.

It is to be noted that with this arrangement elongation can be read very precisely. Furthermore, the stress of tension applied to the sheet can be precisely read when the sheet is horizontal. These can be combined to indicate clearly tension at yield. This tension at yield can be used as a signal for starting the cycle of operation. The proper tension on the stock can be maintained by the angulation device. The angulation device can be used independently, if the tension reflected by the load bar 89, for example, has been established by running one or two sheets from a given lift, so that it is no longer necessary to reflect the tension of each sheet by the memory potentiometer.

Referring to FIG. 10, a modified mechanical form of angulation control is illustrated. In that modification, a roller 160, comparable to the roller 132, rides on the sheet of stock and mechanically drives a suitable cam 162 which directly operates a pump plunger 163, which supplies pressure fluid to a piston and cylinder assemblage 164. The assemblage 164 operates, in turn, a relief valve 165, comparable to the valve 108, which, in turn, varies the pressure applied to the stretch forming assemblages 52 in relation to the angular position of the roller 160 and cam 162.

As mentioned, there is a tendency for the stretch head to bind with respect to its carriage 50, as the head lowers and thereupon the load bars 89 and strain gauges 92 may not reflect the true tension. However, this is relatively unimportant, as the overriding signal of tension at yield is combined with the angulation signal for maintaining the proper tension on the stock independently of the tension reflected by the load bar which, in any event, will not exceed the signal for tension at yield.

Having thus described my invention, I claim:

1. A stretch draw machine comprising a bed, a power driven ram movable downwardly and upwardly toward and away from the bed, respectively, in a predetermined path;
   complementary drawing dies carried by the ram and bed, respectively;
   a pair of stretch heads at opposite sides of said path and operable to grip opposite margins of a length of stock to be stretched and formed;
   means supporting at least one of said heads for movement toward and away from the path and for movement upwardly and downwardly relative to the bed;
   stretch power means for applying predetermined tensioning components of force to said one head in a direction transversely of said path for moving said one head away from said path for stretching the length of stock;
   settable power control means for controlling the force components applied by the stretch power means, and operable to cause the stretch power means to impose an initial component of force, in said direction, which is adequate to tension the stock into a range above its elastic limit;
   additional means operative in a predetermined relation to the lowered positions of said one head, and consequently to the resultant downward angle of slope of the portion of the stock between said one head and the die on the bed, to cause the settable power control means to reduce the component applied by the stretch power means as the angle of slope increases, whereby the resultant tensioning force applied by the head along said downward angle of slope, as the result of the concurrent operation of the stretch power means and the downward movement of the elevator means, is maintained more nearly equal to said initial component.

2. A structure according to claim 1 wherein the stretch power means are arranged so that said components of force applied thereby are substantially horizontal.

3. A structure according to claim 1 wherein first settable signal producing means are provided and are connected to the settable power control means for controlling the settable power control means in response to signals from said first signal producing means;
   said additional means include a second signal producing means for producing signals reflecting said downward angle of slope; and
   means are provided which connect the second signal producing means to the settable power control means so as to modify the operation of the settable power control means imposed by the first signal producing means.

4. A structure according to claim 3 wherein the first signal producing means include a tension sensing means connected to one of the heads for producing signals reflecting the components of tension.

5. A structure according to claim 4 wherein the stretch power means are arranged so that said components of force applied thereby are substantially horizontal and the tension sensing means include a tension bar constrained to elongation in a direction parallel to the direction of application of said components by the stretch forming power means.

6. A structure according to claim 3 wherein the first signal means are manually settable for reflecting said initial component.

7. A structure according to claim 3 wherein the first signal means includes a detector for detecting tension at yield and supplying a signal reflecting the same, and a feed back memory device for receiving and remembering said signal for tension at yield as said initial component.

8. A structure according to claim 3 wherein the settable power control means include a motor driven control, said first and second signal producing means produce electric signals, and the motor is operable in response to said electric signals.

9. A structure according to claim 3 wherein said additional means comprise a movable feeler, movable to different positions by changes in angle of the sheet and means reflecting the positions of the feeler for controlling the stretch power means in relation to said positions.

10. A structure according to claim 3 wherein means are provided for rendering the additional means operative and inoperative selectively.

11. A structure according to claim 3 wherein manually settable means are provided for increasing and decreasing the signal produced by the additional means.

12. An apparatus for stretching metal stock and comprising a pair of stock gripping heads;
- means supporting the heads for movement relatively toward and away from each other for stretching a length of stock gripped by the heads;
- stretch power means for moving the heads relatively away from each other;
- control means for the stretch power means for varying the tensioning force exerted by the stretch power means;
- tension sensing means for sensing the tension applied to the stock;
- elongation sensing means for sensing the elongation of the stock;
- detector means responsive to both sensing means for detecting the ratio of strain to stress and thereby the yield of the stock.

13. An apparatus according to claim 12 and including additionally means which are responsive to the detector means and which initiate operation of the power means when the yield point is detected.

14. An apparatus for stretching metal stock and comprising a pair of stock gripping heads;
- means supporting the heads for movement relatively toward and away from each other for stretching a length of stock gripped by the heads;
- stretch power means for moving the heads relatively away from each other;
- control means for the stretch power means for varying the tensioning force exerted by the power means;
- elongation means including a signal device mounted on one head in fixed position relative thereto;
- cooperable means mounted on the other head in fixed position relative thereto; and
- means interconnecting the device and cooperable means for operating the device by the cooperable means upon movement of the heads relatively away from each other.

15. An apparatus for stretching metal and comprising a pair of stock gripping heads;
- means supporting the heads for relative movement toward and away from each other for stretching a length of stock gripped by the heads;
- stretch power means for moving the heads relatively away from each other for tensioning the stock;
- power control means for the stretch power means for varying the tension applied by the stretch power means;
- tension responsive signal means for producing a tension signal reflecting changes in tension applied by the heads;
- elongation responsive means for producing an elongation signal reflecting changes in the elongation of the stock; and
- detector means responsive to both signals for providing a detected signal reflecting the ratio of strain to stress and thereby the yield of the stock.

16. A structure according to claim 15 wherein memory means are provided and are settable by the detector means to provide a constant signal reflecting the tension which occurred at yield.

17. In a stretch forming machine,
- a pair of stretch heads movable toward and away from each other along a predetermined path;
- power means to move the heads away from each other for tensioning stock held thereby;
- an elongation detector comprising a driven member movable along said path and in fixed position endwise of the path relative to one head and including;
- a self-rewinding rotatable drum drivingly connected to the member;
- a self-rewinding reel movable along said path while in fixed position in a direction therealong relative to said other head;
- a tape wound on said drum and having one end portion wound on the reel;
- said drum having greater resistance to unwinding than the rewinding power of said reel;
- means to stop rewinding of the drum at a predetermined starting position while the tape is connected to the reel and the reel is in a condition for paying out tape wound thereon;
- means to connect the power means to a source of power whereby force is applied to the heads and moves them apart a distance for first removing the sag from the stock and then additionally to stretch the stock as the force increases, and
- settable means responsive to the force being applied to stop the pay out of the tape by the reel and to hold said end portion in fixed relation to said other head after said other head has moved said first mentioned distance.

18. In a stretch forming machine, a bed, a die thereon, gripping heads at opposite sides of the die;
- elevator means for moving the head upwardly and downwardly and concurrently toward and away from the die;
- means connected to the head and constraining the head to parallelism with a preselected head position at all times during movements of the head to said raised and lowered positions and toward and away from the die;
- stretch power means for applying force horizontally to the head in all of said raised and lowered positions;
- control means to vary the force applied by the stretch power means;
- elevator power means for lowering the elevator means for moving the head downwardly for laying the stock onto the die;
- a rocker movable with said one head along said paths and rockable about a horizontal axis extending transversely of the paths;
- means on the rocker for rocking therewith and positioned for riding on said portion of the stock between said one head and the point of engagement of the stock with the die so as to rock the rocker in accordance with the angle of said portion of the stock, and
- means responsive to the rocked positions of the rocker to operate the control means.

19. A stretch draw machine comprising a bed, a power driven ram movably downwardly and upwardly toward and away from the bed, respectively, in a predetermined path;
- complementary drawing dies carried by the ram and bed, respectively;
- a pair of stretch heads at opposite sides of said path;
- means supporting at least one of said heads for movement toward and away from the path;
- stretch power means for applying components of tensioning force to said one head transversely of the path;
- means for controlling the transverse component of force applied by the stretch power means to said one head;
- elevator means supporting said one head for movement downwardly generally along said path toward the bed; and
- angulation control means operative in predetermined relation to the lowered position of the head, and consequently in relation to the resultant angle of downward slope of the portion of the stock between said one head and the die on the bed, to reduce progressively the transverse component of force applied by the stretch power means to said one head as the downward slope increases.

20. A stretch draw machine comprising a die support member, a die mounted thereon, a stretch head member at one side of said support member, operable to grip a margin of a length of stock to be stretched and formed;
  means at the opposite side of the support member to grip the opposite margin of said length of stock;
  means supporting said members for movement upwardly and downwardly relative to each other along a generally upright path;
  means supporting said head member for movement toward and away from said path;
  stretch power means for applying predetermined tensioning components of force to said head member in a direction toward and away from said support member, for stretching the length of stock;
  settable power control means for controlling the force components applied by the stretch power means, and operable to cause the stretch power means to impose an initial component of force, in said direction, which is adequate to tension the stock into a range above its elastic limit;
  additional means operative in a predetermined relation to the relatively raised and lowered positions of said members, and consequently to the resultant downward angle of slope of the portion of the stock from the die to said head member to cause the settable power control means to reduce the component applied by the stretch power means as said angle of slope increases, whereby the resultant tensioning force applied by the head member along said downward angle of slope, as the result of the concurrent operation of the stretch power means and the relative upward and downward movement of the members, is maintained more nearly equal to said initial component.

References Cited
UNITED STATES PATENTS 3,116,780  2/1962  Bath _____ 72—297
3,302,437  2/1967  Dolney _____ 72—296

CHARLES W. LANHAM, *Primary Examiner.*

R. D. GREFE, *Assistant Examiner.*